United States Patent
Kodera et al.

(10) Patent No.: US 10,760,188 B2
(45) Date of Patent: Sep. 1, 2020

(54) NON-COATED AIR BAG FABRIC AND AIR BAG

(71) Applicant: SEIREN CO., LTD., Fukui-shi, Fukui (JP)

(72) Inventors: Shota Kodera, Fukui (JP); Tsuyoshi Houraiya, Fukui (JP)

(73) Assignee: SEIREN CO., LTD., Fukui-Shi (JP)

( * ) Notice: Subject to any disclaimer, the term of this patent is extended or adjusted under 35 U.S.C. 154(b) by 0 days.

(21) Appl. No.: 16/337,018

(22) PCT Filed: Sep. 27, 2017

(86) PCT No.: PCT/JP2017/035081
§ 371 (c)(1),
(2) Date: Mar. 27, 2019

(87) PCT Pub. No.: WO2018/062333
PCT Pub. Date: Apr. 5, 2018

(65) Prior Publication Data
US 2019/0218692 A1  Jul. 18, 2019

(30) Foreign Application Priority Data

Sep. 28, 2016  (JP) ................ 2016-189238

(51) Int. Cl.
| | | |
|---|---|---|
| *D03D 1/02* | (2006.01) | |
| *D03D 15/00* | (2006.01) | |
| *B60R 21/235* | (2006.01) | |
| *B60R 21/237* | (2006.01) | |

(52) U.S. Cl.
CPC .............. *D03D 1/02* (2013.01); *B60R 21/235* (2013.01); *B60R 21/237* (2013.01); *D03D 15/00* (2013.01); *B60R 2021/23509* (2013.01); *B60R 2021/23538* (2013.01); *B60R 2021/23542* (2013.01); *D03D 2700/0133* (2013.01); *D10B 2331/04* (2013.01); *D10B 2505/124* (2013.01)

(58) Field of Classification Search
CPC ........... B60R 2021/23509; B60R 2021/23538; B60R 2021/23542; B60R 21/235; B60R 21/237; D03D 5/00; D03D 1/02; D03D 2700/0133; D10B 2331/04; D10B 2505/124
See application file for complete search history.

(56) References Cited

U.S. PATENT DOCUMENTS

| | | | |
|---|---|---|---|
| 5,236,775 A | 8/1993 | Swoboda et al. | |
| 5,637,114 A | 6/1997 | Höhnke | |
| 6,182,709 B1 | 2/2001 | Konishi et al. | |
| 2002/0155774 A1* | 10/2002 | Kitamura | D03D 1/02 442/208 |
| 2010/0048079 A1* | 2/2010 | Fujiyama | B60R 21/235 442/189 |
| 2010/0260976 A1* | 10/2010 | Kano | B60R 21/235 428/172 |
| 2015/0079864 A1 | 3/2015 | Nishimura et al. | |
| 2018/0086300 A1* | 3/2018 | Yamada | B60R 21/235 |
| 2018/0086301 A1* | 3/2018 | Nishimura | B60R 21/235 |
| 2018/0274167 A1* | 9/2018 | Kodera | D06N 3/0006 |
| 2018/0281737 A1* | 10/2018 | Houraiya | B60R 21/235 |

FOREIGN PATENT DOCUMENTS

| | | |
|---|---|---|
| CN | 104271822 A | 1/2015 |
| JP | 4-214437 A | 8/1992 |
| JP | 6-184856 A | 7/1994 |
| JP | 7-232608 A | 9/1995 |
| JP | 7-258940 A | 10/1995 |
| JP | 8-11660 A | 1/1996 |
| JP | 9-309396 A | 12/1997 |
| JP | 10-219543 A | 8/1998 |
| JP | 2002-146647 A | 5/2002 |

OTHER PUBLICATIONS

International Search Report, issued in PCT/JP2017/035081, dated Dec. 19, 2017.
Chinese Office Action and Search Report for Chinese Application No. 201780059250.4, dated Mar. 27, 2020, with English translation.
Extended European Search Report, dated May 15, 2020, for European Application No. 17555282.3.

* cited by examiner

*Primary Examiner* — Arti Singh-Pandey

(74) *Attorney, Agent, or Firm* — Birch, Stewart, Kolasch & Birch, LLP

(57) ABSTRACT

Provided is a non-coated air bag fabric made from polyethylene terephthalate, and the fabric is woven using fibers containing polyethylene terephthalate as the main raw material, the fabric having a cover factor of 2300 or more, Z calculated using the equation below is 8200 or more, and a height difference between recesses and protrusions on the surface of the fabric is less than 130 μm. Z=cover factor/thickness (mm).

4 Claims, 9 Drawing Sheets

NON-COATED AIR BAG FABRIC AND AIR BAG

TECHNICAL FIELD

The present invention relates to a fabric used in an air bag that is widely used as an occupant protection device at the time of vehicle collision, and to a non-coated air bag fabric and an air bag made using the same.

BACKGROUND ART

Air bag devices are commonly provided in a vehicle as a safety device for occupant protection that protects an occupant from impact upon vehicle collision. Conventionally, in order to prevent gas released from an inflator from leaking from the bag, fabric coated with a resin material was mainly used, but fabric needs to be light in weight due to demands for improvements in fuel consumption and the like and needs to be compactly housed due to trends in steering wheel design and the like, and thus non-coated cloth has been widely adopted.

Also, an air bag made of nylon 66 (PA66) was mainstream, but an air bag made of polyethylene terephthalate (PET) is beginning to be adopted for the purpose of reducing cost.

However, there is the issue that polyethylene terephthalate having a higher modulus than nylon 66 has poor foldability. Also, there is the issue that a gap tends to form in the thickness direction between weaving threads due to a high modulus, and low gas permeability is unlikely to be achieved.

To address these issues, Patent Literature 1 discloses a technique regarding a non-coated fabric for an air bag that exhibits excellent storability and expansion responsiveness and in which the fineness of filaments constituting the fabric, the single fiber fineness of filaments, the amount of fibers per unit area, gas permeability, thickness, and a bending resistance measured using a cantilever method are defined. However, the non-coated fabric for an air bag obtained by this technique has a gas permeability of 0.5 to 3.0 ml/cm$^2$·sec obtained using a Frazier method (0.9 ml/cm$^2$·sec or more obtained using a Frazier method in working examples), which cannot be considered as having low gas permeability, and thus is not sufficient in terms of performance as a fabric for an air bag.

Also, Patent Literature 2 discloses a technique by which a flexible fabric that has little fuzz and thread breakage, foldability, and low gas permeability is obtained by forming a fiber structure using a composite fiber yarn obtained using sea-island composite spun yarn and then forming extremely fine fibers using the fiber structure. However, the gas permeability of the fabric obtained using this technique cannot be considered as being low (0.7 ml/cm$^2$·sec or more obtained using a Frazier method in working examples), and the cost of the raw yarn is high due to a sea-island composite yarn being used as the raw yarn, and the manufacturing cost is also high due to the need for processing to remove the sea component. Furthermore, there is a possibility that flame retardancy will decrease if processing to remove the sea component is insufficient, and thus this fabric is not suitable as a fabric for an air bag.

CITATION LIST

Patent Literature

Patent Literature 1: JP H9-309396A
Patent Literature 2: JP H7-258940A

SUMMARY OF INVENTION

Technical Problem

An object of the present invention is to provide a non-coated air bag fabric having good foldability and excellent low gas permeability, and an air bag made of the same.

Solution to Problem

That is, a non-coated air bag fabric of the present invention is woven using fibers containing polyethylene terephthalate as a main raw material, and the fabric has a cover factor F of 2300 or more, a thickness D (mm) of the fabric and the cover factor F satisfy F/D 8200, and a height difference between a recess and a protrusion on a surface of the fabric is less than 130 μm.

In the above-described non-coated air bag fabric, a single fiber fineness of threads that constitute the fabric may be 1.0 to 3.5 dtex.

Also, the present invention relates to an air bag formed using at least one main body base cloth formed using the above-described non-coated air bag fabric.

Advantageous Effects of Invention

According to the present invention, it is possible to provide a non-coated air bag fabric that has good foldability and excellent low gas permeability, and an air bag.

DESCRIPTION OF EMBODIMENTS

Figure 1:
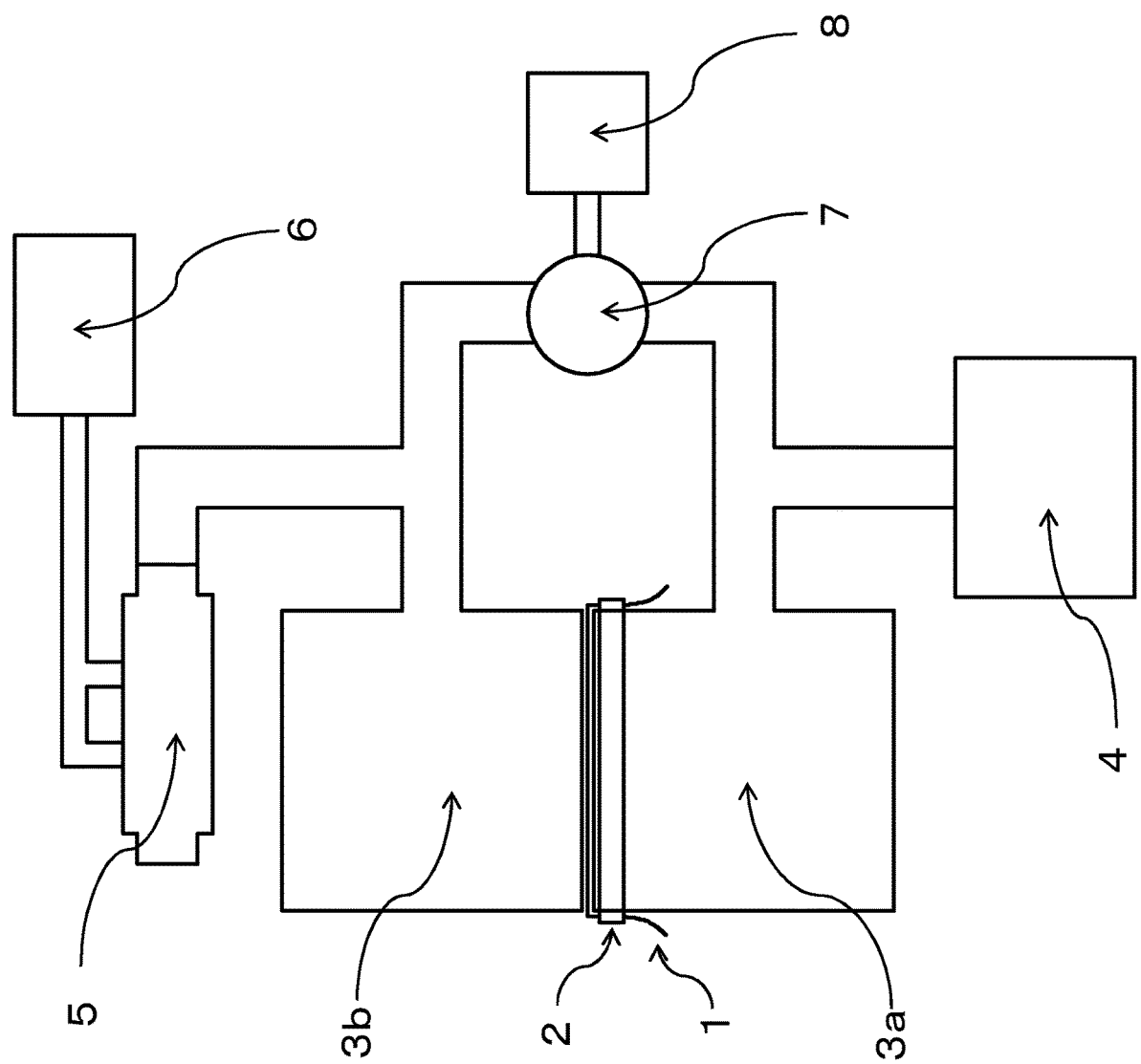
FIG. 1 is a schematic diagram of a greige gas permeability measurement apparatus.
Figure 2:
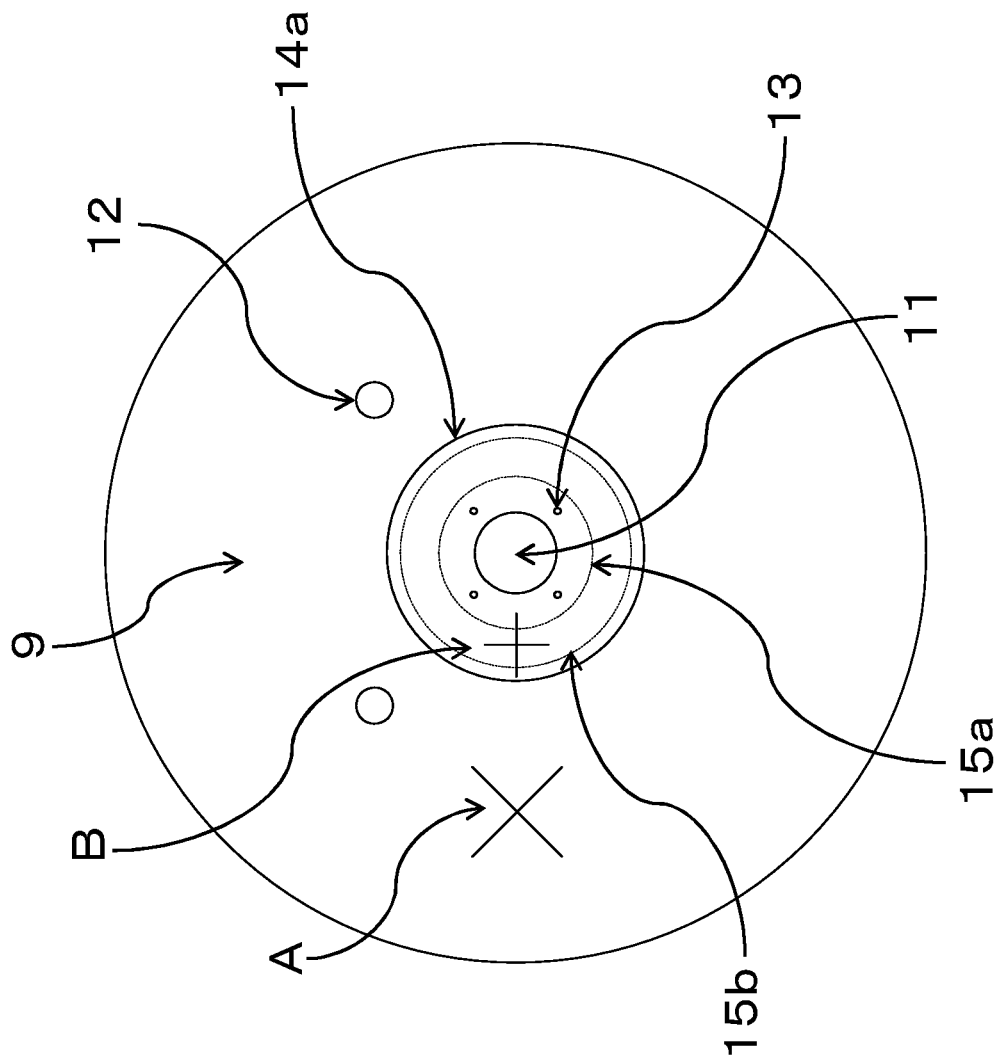
FIG. 2 is a front view showing a state in which three pieces of annular cloth are sewn to a mounting port-side main body base cloth of an air bag for evaluation.

A non-coated air bag fabric of the present invention is a fabric mainly made from polyethylene terephthalate. This fabric has a cover factor F of 2300 or more, and with regard to this cover factor F and the thickness D of the fabric, the filling degree Z calculated from the equation below is 8200 or more. Also, a height difference between a recess and a protrusion on a surface of the fabric is less than 130 μm.

Filling degree $Z$=cover factor $F$/thickness $D$(mm)

Hereinafter, this fabric will be described in more detail. First, it is important that the cover factor F of the fabric is 2300 or more. By setting the cover factor F to 2300 or more, gaps between weaving threads are small and excellent low gas permeability can be obtained. Also, it is preferable that the cover factor F is 2800 or less because the flexibility of the fabric is unlikely to be impaired and good foldability can be obtained. Good foldability refers to the height of the folded fabric being low and the folded fabric becoming compact. Note that in the present invention, the cover factor F is a value calculated using the equation below.

Cover factor $F$=warp density of fabric×√total fineness of warp+weft density of fabric×√total fineness of weft Also, as described above, it is important that Z obtained by dividing the cover factor F of the fabric by the thickness D of the fabric is 8200 or more. Z is a value indicating the filling degree on the surface of the fabric and the filling degree in the thickness direction of the fabric, and when this value is high, it means that no gap is formed in the thickness direction of the fabric. Thus, by setting Z to 8200 or more, it is possible to achieve excellent foldability and low gas permeability. There is no particular limitation on the thickness D of the fabric, and the thickness D of the fabric may be 0.24 to 0.35 mm, for example, preferably 0.25 to 0.33 mm, and more preferably 0.28 to 0.32 mm. Note that the thickness D of the fabric can be measured in conformity with method A in JIS L 1096 8.4, for example.

Also, it is important that the height difference between recesses and protrusions on a surface of the fabric is less than 130 μm, and more preferably less than 120 μm. By setting the height difference to be less than 130 μm, the number of gaps formed when the fabric is folded decreases, and excellent foldability can be obtained. Note that the height difference between recesses and protrusions on the surface of the fabric can be obtained using a surface roughness measuring device. For example, the entire surface of the fabric is fixed to a flat surface using double-sided tape, and then the height difference between recesses and protrusions on the surface of the fabric can be measured using a surface roughness measuring device.

Note that the height difference between recesses and protrusions can be adjusted by adjusting the density, the total fineness, and the number of filaments (single fiber fineness). Specifically, for example, it is thought that, if the density is high, waviness of a thread increases at the time of sewing, and the height difference increases. Also, it is thought that, if the total fineness is large, a thread is thick and the height difference increases. On the other hand, for example, it is thought that, if the number of filaments is high and a single fiber fineness is small, a thread is likely to collapse, and thus the height difference decreases.

With regard to the gas permeability of the fabric of the present invention, gas permeability that is measured using a Frazier method is preferably 0.5 ml/cm$^2$·sec or less, and more preferably 0.3 ml/cm$^2$·sec or less. By setting the gas permeability to be the above-described value, if a base cloth for an airbag is formed using the fabric of the present invention, gas leakage from the surface of this base cloth is reduced and the size of an inflator can be reduced and the inflator can be quickly deployed.

Threads that constitute the fabric of the present invention preferably have a total fineness of 280 dtex or more. If the total fineness of threads is 280 dtex or more, the strength of the fabric becomes more superior as an air bag. Also, the total fineness is preferably 560 dtex or less and more preferably 470 dtex or less because a lightweight fabric can be easily obtained.

Threads that constitute the fabric may be the same or different from each other. For example, the fabric may be constituted by threads having different single fiber finenesses (=total fineness/the number of filaments). Specifically, for example, it is preferable to use a thread that has a single fiber fineness of 1.0 to 3.5 dtex. By setting the fineness of single fibers to 3.5 dtex or less, it is possible to increase the flexibility of the fabric, improve the foldability of the air bag, and also reduce the gas permeability. Also, the fineness of the single fibers is preferably 1.0 dtex or more because the single fibers are unlikely to break in the spinning process, the weaving process, or the like.

Also, it is sufficient that the cross-sectional shape of a single fiber is selected from a circle, an ellipse, a flattened shape, a polygon, a hollow shape, other variants, and the like. It is sufficient to use mixed fibers, doubling threads, combined use threads, mixed use threads thereof (the warp and the weft have different cross-sectional shapes), or the like as needed, and to appropriately select the cross-sectional shape to the extent that the spinning process, the fabric production process, the fabric physical properties, and the like are not hindered.

One or more of various additives that are used to improve spinnability, processability, durability, and the like of fibers may be used for these fibers, examples including a heat-resistant stabilizer, an antioxidant, a light-resistant stabilizer, an aging resister, a lubricant, a smoothing agent, a pigment, a water repellent agent, an oil-repellent agent, a masking agent such as titanium oxide, a gloss imparting agent, a flame retardant, and a plasticizer.

The texture of the fabric may be any of a plain weave, a basket weave, a grid weave (ripstop weave), a twill weave, a cord weave, a leno weave, a mock leno weave, and a composite texture thereof. Beside a two-axis design with warp and weft, a multi-axis design including axes that are inclined at 60 degrees may be adopted as needed, and in this case, the arrangement of threads need only be in conformity with the same arrangement of the warp or the weft. Among these, plain weave is preferable in terms of ensuring the tightness of the structure, the physical properties, and the evenness of the performance.

The weave densities of the warp and the weft of the fabric are each preferably 48 to 75 threads/2.54 cm in terms of performance such as the weavability and gas permeability, and more preferably 55 to 68 threads/2.54 cm. Note that it is preferable that the number of warp threads and the number of weft threads are equal where possible, and according to this, the warp and the weft are balanced, and gas permeability can be reduced at a high pressure. From this point of view, a difference between the number of warp threads and the number of weft threads per inch (2.54 cm) is preferably 3 or less, for example.

An air bag of the present invention can be obtained by joining at least one main body base cloth obtained by cutting the fabric of the present invention into a desired shape. All of a base cloth that constitutes the air bag are preferably constituted by the fabric, or a portion thereof may be constituted by the fabric. Also, it is sufficient to select the specifications, shape, and volume of the air bag in accordance with the site at which the air bag is to be disposed, the application, housing space, the performance of absorbing occupant impact, the output of the inflator, and the like. Furthermore, a reinforcement cloth may be added according to required performance, and a non-coated fabric that is equivalent to the main body base cloth, a non-coated fabric that is different from the main body base cloth, or a fabric that is coated with a resin and is different from the main body base cloth may be selected as the base cloth used as the reinforcement cloth.

Although joining of the main body base cloths, joining of a main body base cloth and a reinforcement cloth or a hanging string, and fixing of other cut base cloths are performed mainly by sewing, it is possible to use partial adhesion, welding, or the like in combination, or use a joining method employing weaving or knitting. That is, there is no particular limitation on the joining method as long as the air bag has satisfactory durability, impact resistance at the time of deployment, the performance of absorbing occupant impact, and the like.

It is sufficient that cut base cloths are sewn together using a sewing method that is applied to a general air bag, such as lock stitches, multi-thread chain stitches, one side down stitches, looping, safety stitches, zigzag stitches, flattened stitches, or the like. Also, it is sufficient that the fineness of the sewing thread is 700 dtex (corresponding to #20) to 2800 dtex (corresponding to #0), and the stitch count is 2 to 10 stitches/cm. If stitch lines with a plurality of columns are required, it is sufficient to use a multi-needle sewing machine with the distance between stitch lines being about 2 mm to 8 mm, but if the distance of a sewing portion is not long, sewing may be performed using a single-needle sewing machine a plurality of times. If a plurality of base cloths are used as an air bag body, a plurality of base cloths may be sewn together in a stacked state, or sewn together one by one.

It is sufficient that the sewing thread used for sewing is selected as appropriate from among threads that are generally called synthetic threads and threads that are used as industrial sewing threads. Examples thereof include nylon 6, nylon 66, nylon 46, polyester, macromolecular polyolefin, fluorine containing, vinylon, aramid, carbon, glass, and steel threads, and any of spun yarn, filament twisted yarn, or a filament resin processed yarn may be used.

Furthermore, in order to prevent gas leakage from stitches of outer circumferential sewing portions or the like, a sealing material, an adhesive, an adhering material, or the like may be applied to, sprayed onto, or stacked on upper portions and/or lower portions of stitches, gaps between stitches, a margin to seam, or the like.

The air bag of the present invention can be applied to applications in passenger cars, commercial vehicles, buses, motorcycles, and the like as various bags for occupant protection, such as side bags and center bags for front collision protection and side collision protection of a driver/passenger seat, headrest bags for rear seat occupant protection (front collision and rear collision) and headrest bags for rear collision protection, knee bags and foot bags for leg and foot protection, mini bags for infant protection (child seats), bag bodies for an air belt, and bags for pedestrian protection, and furthermore, as long as the function requirements are satisfied, the air bag of the present invention can be applied in multiple applications such as ships, railroad trains, electric railcars, aircraft, and amusement park equipment.

WORKING EXAMPLES

Hereinafter, the present invention will be more specifically described based on working examples, but the present invention is not limited to these working examples. Note that methods for evaluating the properties and performance of a fabric for an air bag will be described below, the evaluation being made in the working examples.

Total Fineness of Threads

Measurement was performed in conformity with method B in JIS L 1013 8.3.1.

Number of Thread Filaments

Measurement was performed in conformity with JIS L 1013 8.4.

Single Fiber Fineness

The single fiber fineness was obtained by dividing the total fineness of threads by the number of thread filaments.

Weave Density of Fabric

Measurement was performed in conformity with method A in JIS L 1096 8.6.1.

Thickness of Fabric

Measurement was performed in conformity with method A in JIS L 1096 8.4.

Height difference between recesses and protrusions on surface of fabric

Recesses and protrusions on the surface of the obtained fabric were measured using a CNC surface roughness measuring machine (SV-3000CNC) manufactured by MITSUTOMO. Co., Ltd. The obtained fabric was cut into 50 mm×50 mm pieces, and the resulting pieces were used as samples for measurement, the samples being collected from five positions that were located 200 mm or more apart from each other in the width direction of the cloth. A sample was placed on a stage of a surface roughness meter in a state in which the entire surface of the sample was adhered to a glass plate using double-sided tape (manufactured by 3M Company, KRE-19). A stylus whose leading end had a radius of 0.002 mm was set on the sample and was linearly moved in a state in which the stylus was in contact with the surface of the cloth at a pressing force of 0.75 mN, and the distance the stylus moved in the up-down direction was measured and the obtained distance was deemed as the unevenness state of the surface. Measurement conditions were set such that the measurement length was 10 mm, the measurement speed was 0.1 mm/sec, and the measurement pitch was 0.001 mm. As a result of performing measurement five times while changing the measurement position of one sample, the results of 25 measurements were obtained from one level of the fabric. A difference between the maximum point and the minimum point in each of the results of measurements was obtained, and an average thereof was deemed to be the height difference between recesses and protrusions on the surface.

Gas Permeability of Fabric 1

Measurement was performed in conformity with method A (Frazier method) in JIS L 1096 8.26.1.

Gas Permeability of Fabric 2

The air flow rate of the obtained fabric under a differential pressure of 20 kPa was measured using a greige air flow rate measurement device (manufactured by KYOTOSEIKO CO., LTD., a flowmeter 6: DF2810P manufactured by COSMO INSTRUMENTS CO., LTD., a laminar flow tube 5: LF2-100L manufactured by COSMO INSTRUMENTS CO., LTD., and a pressure gauge 8: DP-330BA manufactured by COSMO INSTRUMENTS CO., LTD.) shown in FIG. 1. As shown in FIG. 1, Sample 1 was obtained by cutting the obtained fabric into a 20 cm×20 cm piece, and was fixed, using a ring-shaped fastener 2, to a tubular clamp 3a having an inner diameter of 50 mm that was connected to a pressure device 4, and was held by a tubular clamp 3b having an inner diameter of 50 mm that was connected to the laminar flow tube 5. Then, a pressure was applied to Sample 1 from the tubular clamp 3a side, and a pressure adjustment valve 7 was operated such that the pressure gauge 8 displayed 20 kPa. The flow rate of air passing through the sample in the above-described state was detected using the flowmeter 6 that was connected to the laminar flow tube 5, and gas permeability was evaluated using the air flow rate under a differential pressure of 20 kPa.

Method for Producing Air Bag for Evaluation

A method for producing an air bag for evaluation will be described below with reference to FIGS. 2 to 5. A first circular main body base cloth 9 having a diameter of 702 mm and a second circular main body base cloth 10 having a diameter of 702 mm were cut from a prepared fabric. The first main body base cloth 9 was provided, at its central portion, with an inflator mounting port 11 having a diameter of 67 mm and two air outlets 12 having a diameter of 30 mm at two positions (left and right pair) located 125 mm upward of and 115 mm respectively to the left and right from the center of the mounting port 11. Furthermore, the first main body base cloth 9 was provided with bolt fixing holes 13 having a diameter of 5.5 mm at positions located 34 mm upward and downward of and 34 mm to the left and to the right from the center of the mounting port 11 (see FIG. 2). Note that the second main body base cloth 10 is arranged on the occupant side, and was not provided with a mounting port, air outlets, or bolt fixing holes.

Also, a non-coated base cloth that was produced using 470 dtex, 72f nylon 66 fibers and had a weave density of 53/2.54 cm and a coated base cloth that was obtained using 470 dtex, 72f nylon 66 fibers obtained by coating a base cloth having a weave density of 46/2.54 cm with a silicone resin at 45 g/m² were prepared as the reinforcement cloths. As the reinforcement cloths for the inflator mounting port 11, three pieces of annular cloth 14a having an outer diameter of 210 mm and an inner diameter of 67 mm were cut from the non-coated base cloth, and one piece of annular cloth 14b having the same shape as the annular cloth 14a was cut from the coated base cloth.

Figure 3:
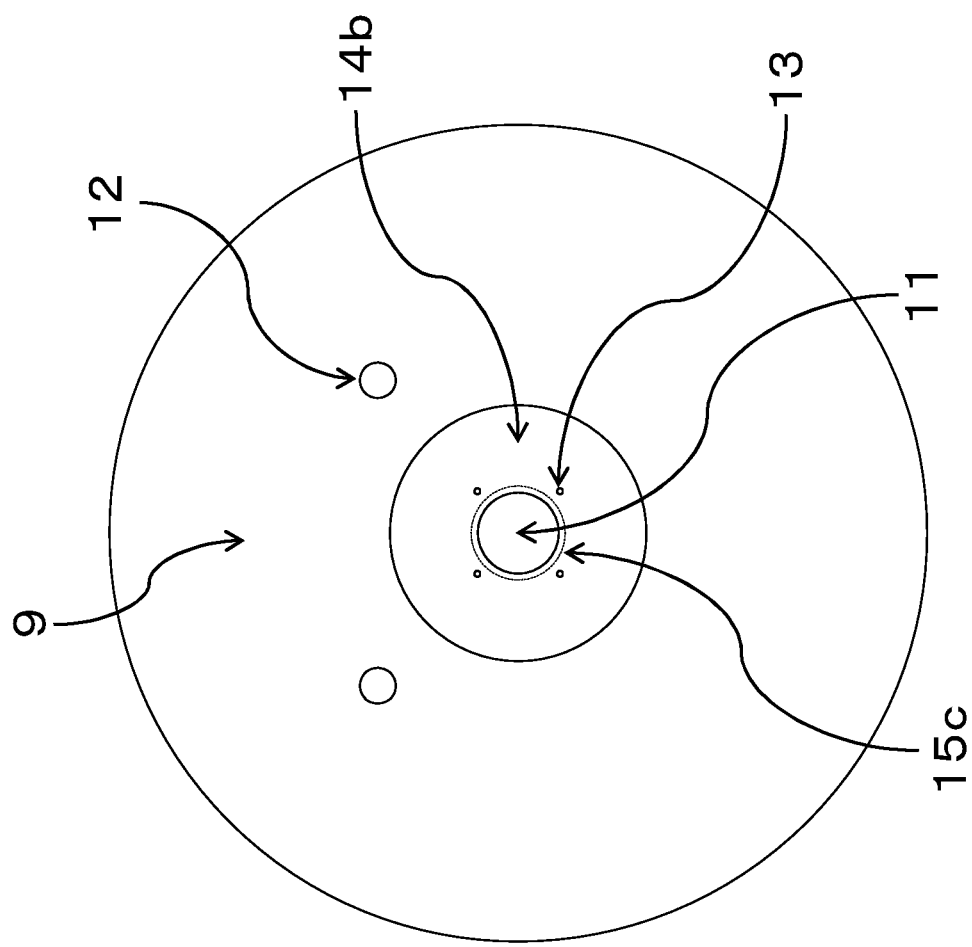
FIG. 3 is a front view showing a state in which four pieces of annular cloth are sewn to a mounting port-side main body base cloth of an air bag for evaluation.

All of the pieces of annular cloth 14a and 14b were provided with bolt fixing holes having a diameter of 5.5 mm at positions corresponding to the bolt fixing holes 13 of the first main body base cloth 9. Furthermore, the three pieces of annular cloth 14a were overlaid on the main body base cloth 9 provided with the inflator mounting port 11 such that the weaving direction of the reinforcement cloth was rotated by 45 degrees with respect to the weaving direction of the main body base cloth 9 (see weaving directions A and B in FIG. 2) and the positions of the bolt fixing holes coincided with each other. Here, A shown in FIG. 2 indicates the weaving direction of the first main body base cloth 9 and B indicates the weaving direction of the pieces of annular cloth. The pieces of cloth were sewn in a circular shape at positions at a diameter of 126 mm (sewing portion 15a) and at a diameter of 188 mm (sewing portion 15b) with the mounting port 11 serving as the center. Furthermore, similarly to the pieces of annular cloth 14a, the piece of annular cloth 14b having the same shape as the pieces of annular cloth 14a was overlaid thereon with the same weaving direction as the pieces of annular cloth 14a from the above, and the four pieces of annular cloth 14a and 14b were sewn to the main body base cloth 9 in a circular shape at a position at a diameter of 75 mm (sewing portion 15c). The main body base cloth 9 after sewing is shown in FIG. 3. Note that the pieces of annular cloth were seamed with the main body base cloth 9 through lock stitching using a nylon 66 sewing thread with the needle thread being 1400 dtex and the bobbin thread being 940 dtex with a stitch count of 3.5 stitches/cm.

Figure 4:
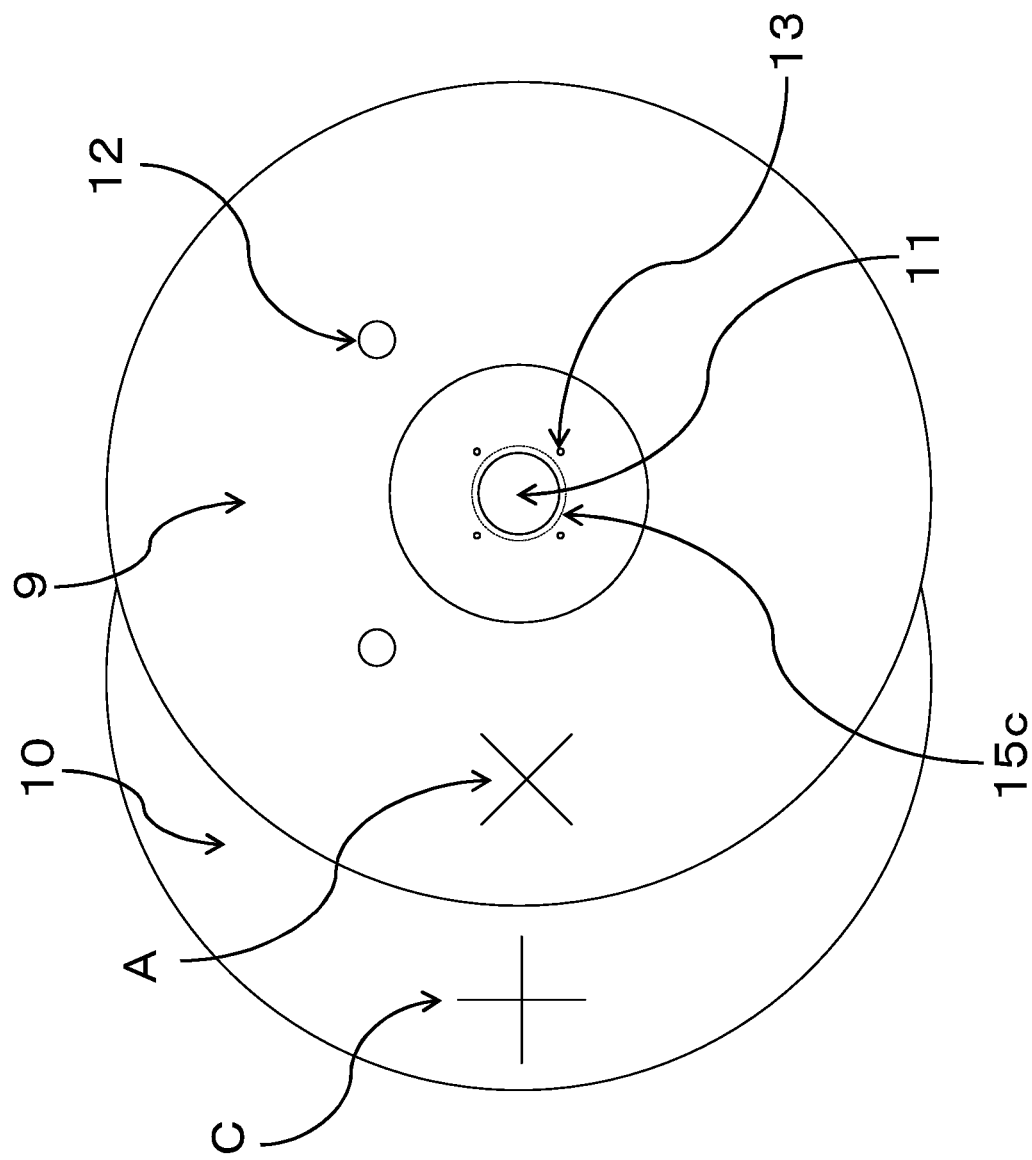
FIG. 4 is a front view showing the manner in which the mounting port-side main body base cloth of the air bag for evaluation and an occupant-side main body base cloth are stacked.
Figure 5:
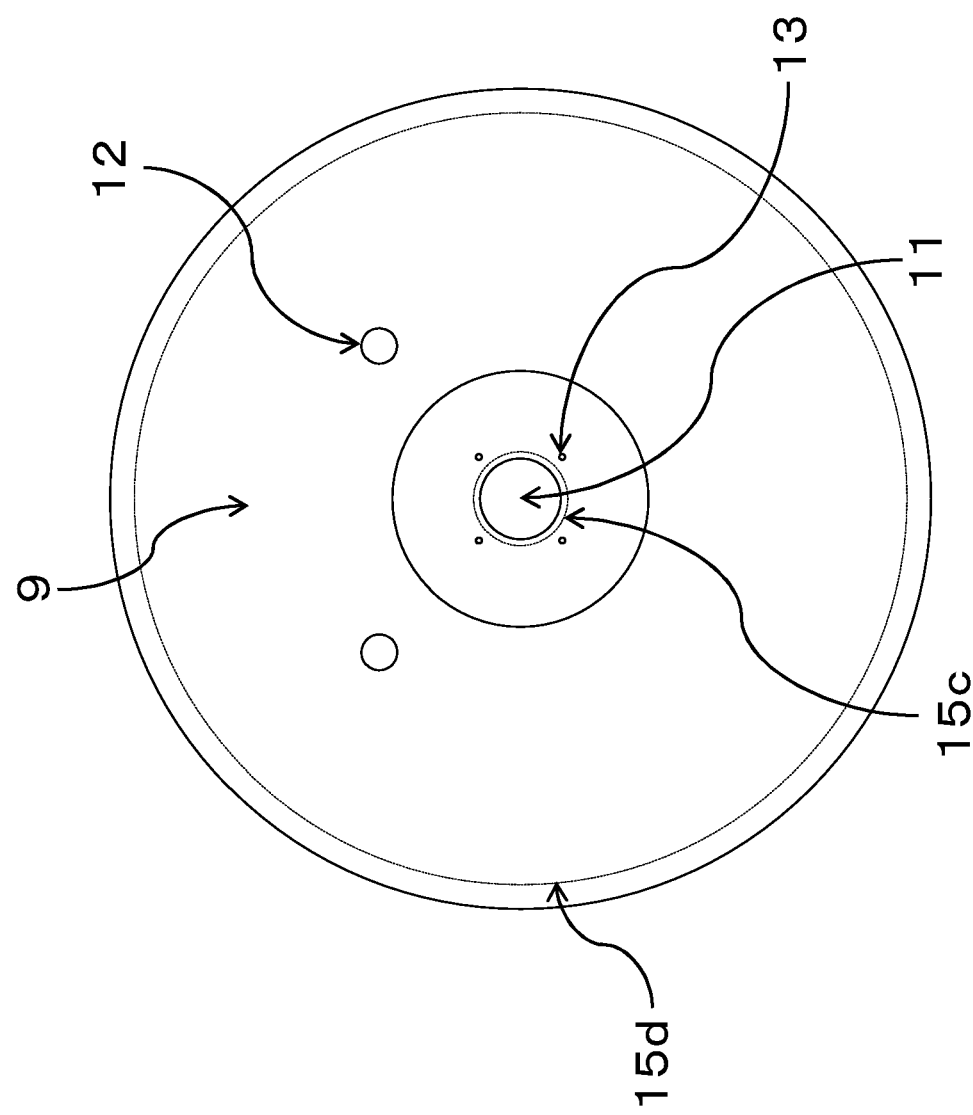
FIG. 5 is a front view showing a state in which the mounting port-side main body base cloth of the air bag for evaluation and an occupant-side main body base cloth are sewn together.

Next, the two main body base cloths 9 and 10 were stacked such that the surfaces of the main body base cloths, with which the pieces of annular cloth were seamed, were located outside and the weaving direction of the main body base cloth 9 was rotated by 45 degrees with respect to the weaving direction of the main body base cloth 10 (FIG. 4). Here, A shown in FIG. 4 indicates the weaving direction of the first main body base cloth 9 and C indicates the weaving direction of the second main body base cloth 10. Furthermore, outer circumferential portions of the overlaid first and second main body base cloths were sewn together through double thread chain stitching with two rows (sewing portion 15d) at a distance between stitch lines of 2.4 mm and a margin to the seam of 13 mm. The sewn state is shown in FIG. 5. The bag was drawn out from the mounting port 11, and the inside and the outside were inverted after sewing so as to obtain a circular air bag having an inner diameter ø of 676 mm. A sewing thread the same as the above-described thread used in lock stitching was used as the sewing thread for sewing the outer circumferential portions.

Air Bag Deployment Test

An inflator was inserted into the air bag that was produced using the above-described method, the air bag was folded from the right and left, and the top and bottom so as to overlap itself at the position of the inflator, and the folded air bag was fixed to a stand for evaluation using a bolt, and then fixed using a piece of tape (NICHIBAN cloth adhesive tape No. 121) such that the fold did not come undone. The inflator was ignited in this state so as to deploy the air bag. An EH5-200 inflator manufactured by Daicel Corporation was used as the inflator. Evaluation was made through measurement of the internal pressure at the time of deployment. The case where the maximum internal pressure at a secondary peak in the deployment test was less than 35 kPa was evaluated as B, and the case where the maximum internal pressure at a secondary peak in the deployment test was 35 kPa or more was evaluated as A.

Air Bag Foldability Evaluation

Figure 6:
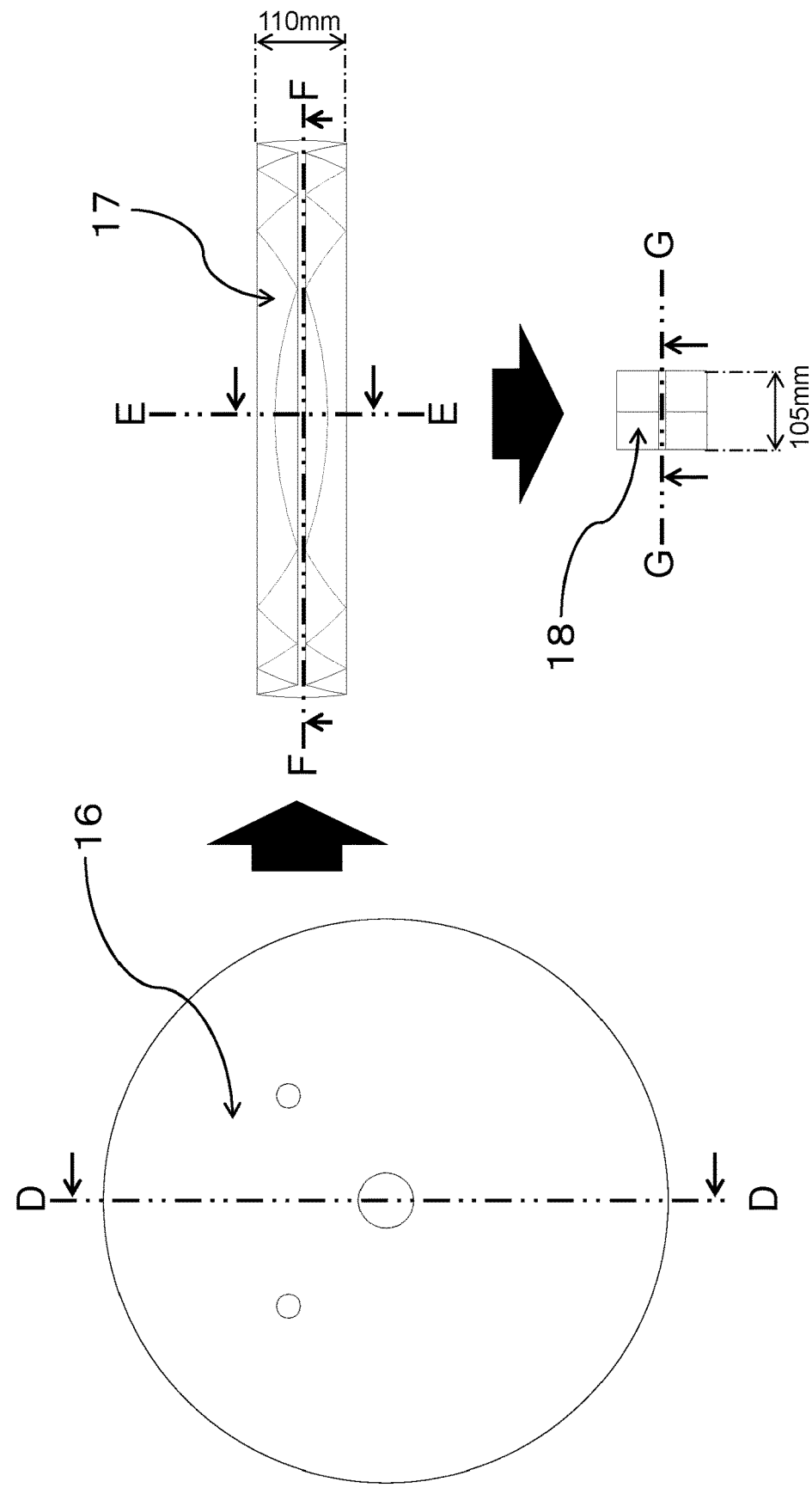
FIG. 6 is a front view of an air bag for evaluation, illustrating a folding procedure in a foldability evaluation test.
Figure 7:
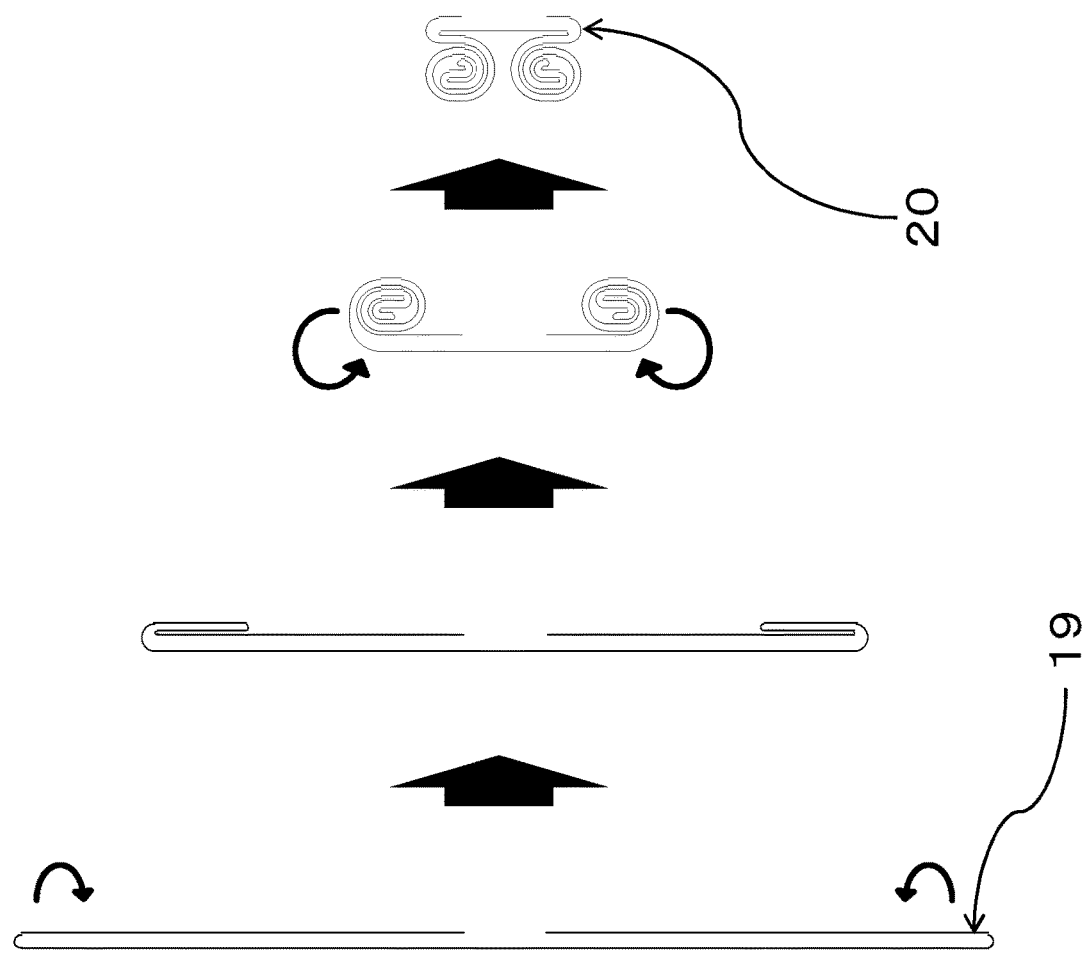
FIG. 7 is a cross-sectional view showing a folding method in the foldability evaluation test.
Figure 8:
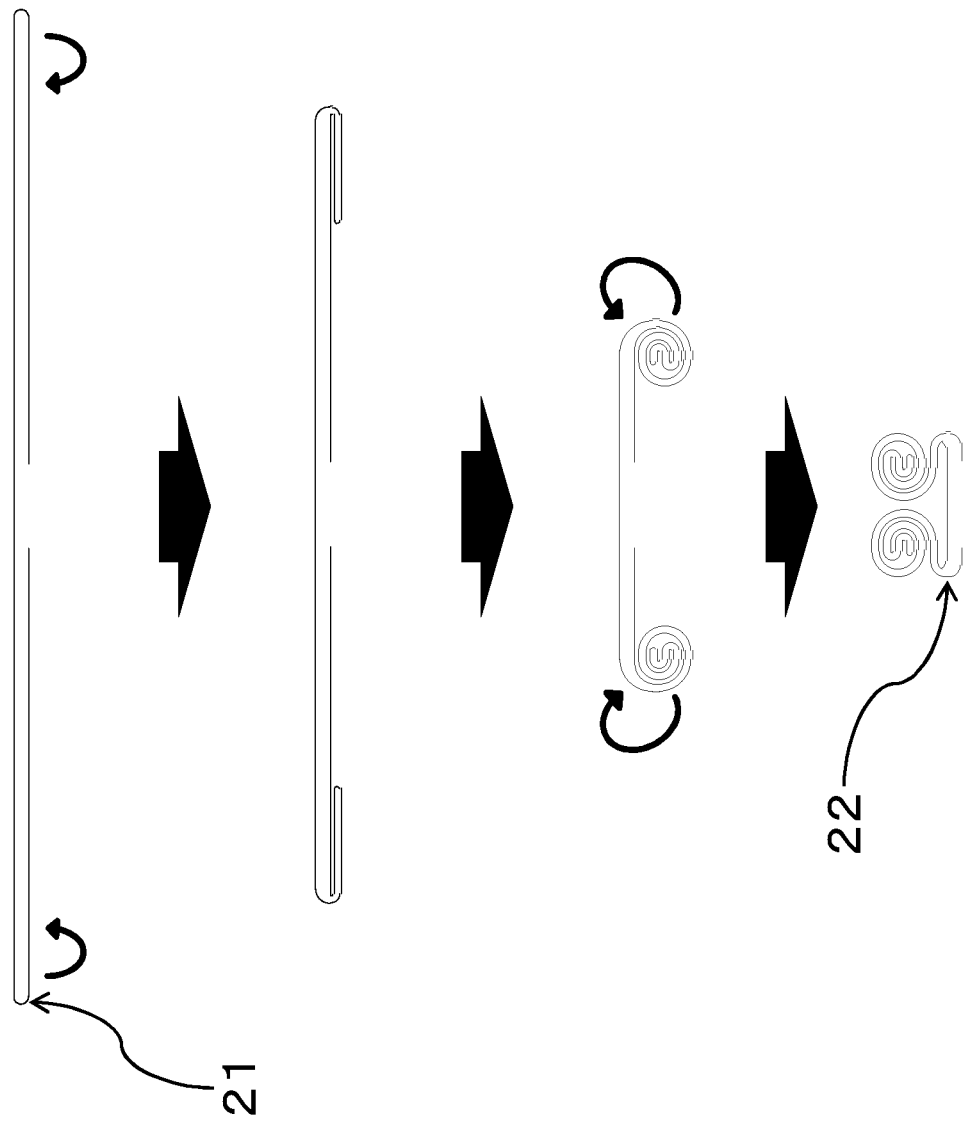
FIG. 8 is a cross-sectional view showing the folding method in the foldability evaluation test.

The air bag that was produced using the above-described method was folded following the procedures shown in FIGS. 6 to 8. FIG. 6 is a diagram showing a procedure used when an air bag for evaluation is folded with the occupant side being the front, and FIG. 7 is a cross-sectional view of the air bag for evaluation taken along line D-D, showing a procedure used when a pre-folding form 16 is folded into an intermediate form 17. The cross-sectional view taken along line E-E of the intermediate form 17 shown in FIG. 6 is a final form 20 shown in FIG. 7. FIG. 8 is a cross-sectional view of the air bag for evaluation taken along line F-F, showing a procedure used when the intermediate form 17 is folded into a completely folded form 18. The cross-sectional view of the completely folded form 18 taken along line G-G shown in FIG. 6 is a final form 22 shown in FIG. 8.

Figure 9:
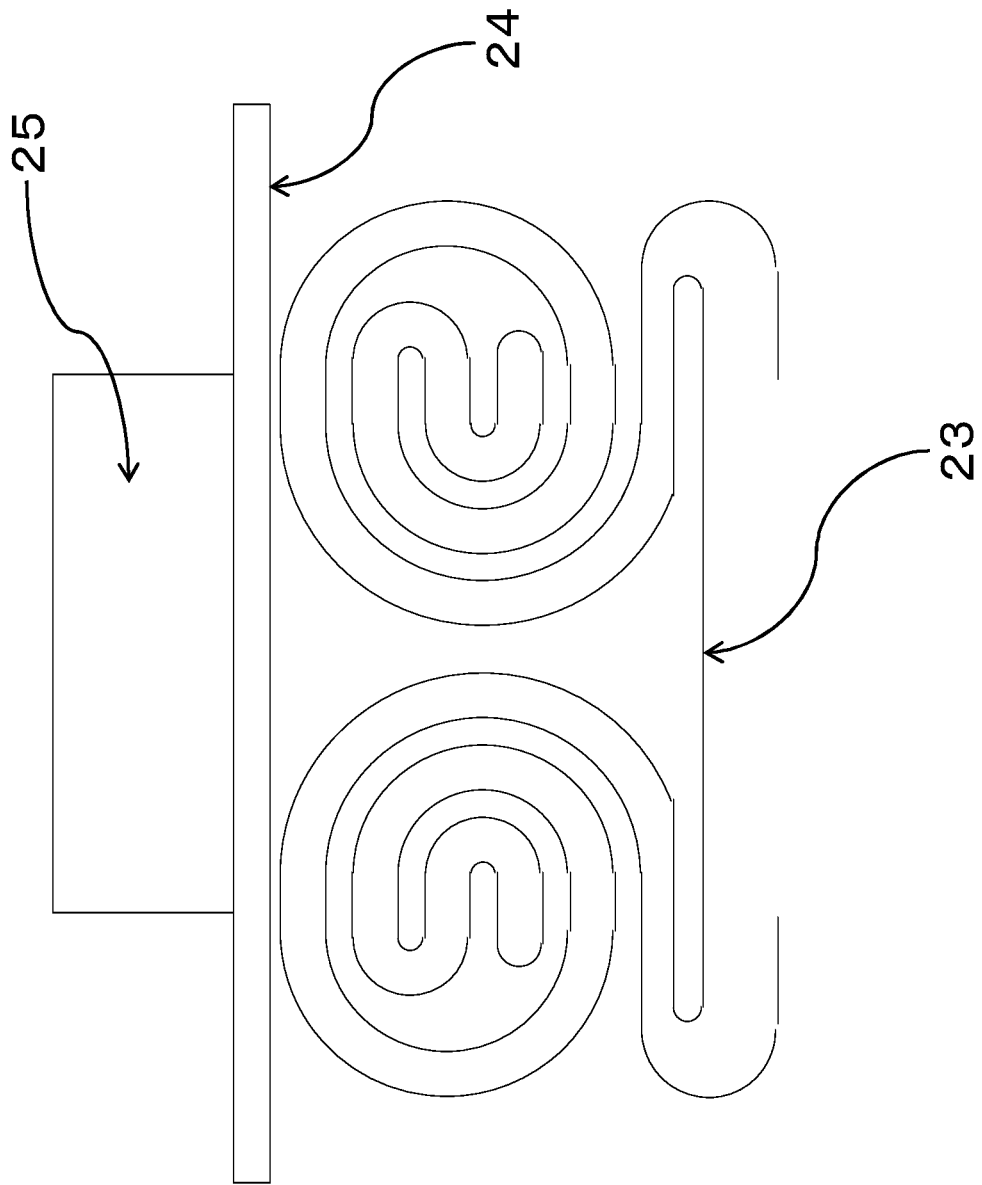
FIG. 9 is a cross-sectional view showing the folding method in the foldability evaluation test.

While the air bag was being folded, adjustment was performed such that the width of the intermediate form 17 was 110 mm, and the width of the completely folded form 18 was 105 mm. Then, as shown in FIG. 9, the height of the folded air bag 23 was measured in a state in which a 130 mm×130 mm×2 mm aluminum plate 24 was placed on the folded air bag 23 and a 1-kg weight 25 was placed thereon. Evaluation was made according to the magnitude of the height after folding, and the case where the height was 45 mm or more was evaluated as B, and the case where the height was less than 45 mm was evaluated as A. Note that 45 mm is a value made in consideration of a space for housing a normal air bag.

Next, working examples and comparative examples will be described. Hereinafter, non-coated air bag fabrics according to Working Examples 1 to 4 and Comparative Examples 1 and 2 will be described, and the above-described evaluations made on air bags that were produced using these non-coated air bag fabrics will be described. The results are shown in Table. 1.

Working Example 1

A plain woven fabric was produced using polyethylene terephthalate threads having a total fineness of 470 dtex, a filament number of 182, and a single fiber fineness of 2.58 dtex for the warp and the weft, and scouring and setting were performed so as to obtain a fabric in which the warp had a weave density of 62/2.54 cm and the weft had a weave density of 60/2.54 cm. The obtained fabric had a cover factor F of 2645 and had a filling degree Z of 8560, and the height difference between recesses and protrusions on the surface was 121 μm. When the gas permeability of this fabric was measured, the fabric had a very low gas permeability of 0.10 mL/cm$^2$·sec obtained using a Frazier method and 0.10 L/cm$^2$·min under a differential pressure of 20 kPa. Also, an air bag for evaluation was produced using this fabric, and when a deployment test was performed and foldability evaluation was made, the maximum internal pressure at a secondary peak exhibited a sufficient internal pressure of 43 kPa, and the height after folding was 42.9 mm, and thus the air bag for evaluation had excellent foldability.

Working Example 2

A plain woven fabric was produced using polyethylene terephthalate threads having a total fineness of 470 dtex, a filament number of 144, and a single fiber fineness of 3.26 dtex for the warp and the weft, and scouring and setting were performed so as to obtain a fabric in which the warp had a weave density of 62/2.54 cm and the weft had a weave density of 59/2.54 cm. The obtained fabric had a cover factor F of 2623 and had a filling degree Z of 8462, and the height difference between recesses and protrusions on the surface was 128 μm. When the gas permeability of this fabric was measured, the fabric had a very low gas permeability of 0.12 mL/cm$^2$·sec obtained using a Frazier method and 0.11 L/cm$^2$·min under a differential pressure of 20 kPa. Also, an air bag for evaluation was produced using this fabric, and when a deployment test was performed and foldability evaluation was made, the maximum internal pressure at a secondary peak exhibited a sufficient internal pressure of 41 kPa, the height after folding was 43.8 mm, and thus the air bag for evaluation had excellent foldability.

Working Example 3

A plain woven fabric was produced using polyethylene terephthalate threads having a total fineness of 470 dtex, a filament number of 182, and a single fiber fineness of 2.58 dtex for the warp and the weft, and scouring and setting were performed so as to obtain a fabric in which both the warp and the weft had a weave density of 55/2.54 cm. The obtained fabric had a cover factor of 2385 and had a filling degree Z of 8252, and the height difference between recesses and protrusions on the surface was 102 μm. When the gas permeability of this fabric was measured, the fabric had a gas permeability of 0.39 mL/cm$^2$·sec obtained using a Frazier method and 0.35 L/cm$^2$·min under a differential pressure of 20 kPa, which met the performance of an air bag. Also, an air bag for evaluation was produced using this fabric, and when a deployment test was performed and foldability evaluation was made, the maximum internal pressure at a secondary peak exhibited a sufficient internal pressure of 38 kPa despite being slightly lower than those of Working Examples 1 and 2, and the height after folding was 41.3 mm, and thus the air bag for evaluation had excellent foldability.

Working Example 4

A plain woven fabric was produced using polyethylene terephthalate threads having a total fineness of 470 dtex, a filament number of 144, and a single fiber fineness of 3.26 dtex for the warp and the weft, and scouring and setting were performed so as to obtain a fabric in which both the warp and the weft had a weave density of 55/2.54 cm. The obtained fabric had a cover factor of 2385 and had a filling degree Z of 8223, and the height difference between recesses and protrusions on the surface was 108 μm. When the gas permeability of this fabric was measured, the fabric had a gas permeability of 0.49 mL/cm$^2$·sec obtained using a Frazier method and 0.45 L/cm$^2$·min under a differential pressure of 20 kPa, which met the performance of an air bag. Also, an air bag for evaluation was produced using this fabric, and when a deployment test was performed and foldability evaluation was made, the maximum internal pressure at a secondary peak exhibited a sufficient internal pressure of 36 kPa despite being lower than those of Working Examples 1 and 2, and the height after folding was 42.0 mm, and thus the air bag for evaluation had excellent foldability.

Comparative Example 1

A plain woven fabric was produced using polyethylene terephthalate threads having a total fineness of 470 dtex, a filament number of 120, and a single fiber fineness of 3.92 dtex for the warp and the weft, and scouring and setting were performed so as to obtain a fabric in which the warp had a weave density of 61/2.54 cm and the weft had a weave density of 54/2.54 cm. The obtained fabric had a cover factor of 2493 and had a slightly low filling degree Z of 8095, and the height difference between recesses and protrusions on the surface was slightly large at 132 μm. When the gas permeability of this fabric was measured, the fabric had a sufficient gas permeability of 0.36 mL/cm$^2$·sec obtained using a Frazier method, but had a large gas permeability of 1.23 L/cm$^2$·min under a differential pressure of 20 kPa, and thus the performance of an air bag was not met. Also, an air bag for evaluation was produced using this fabric, and when a deployment test was performed and foldability evaluation was made, the maximum internal pressure at a secondary peak was low at 32 kPa, and the height after folding was 45.5 mm, and thus the air bag for evaluation had slightly inferior foldability. It is thought that, with regard to poor foldability, a large height difference between recesses and protrusions on the surface has an influence. Also, it is thought that the maximum internal pressure at a secondary peak is low due to the filling degree Z being low. It is thought that the reason as to why the maximum internal pressure at a secondary peak is lower than in Comparative Example 2, which will be described below, is that the warp and the weft are not balanced.

Comparative Example 2

A plain woven fabric was produced using polyethylene terephthalate threads having a total fineness of 560 dtex, a filament number of 96, and a single fiber fineness of 5.83 dtex for the warp and the weft, and scouring and setting were performed so as to obtain a fabric in which the warp had a weave density of 55/2.54 cm and the weft had a weave density of 51/2.54 cm. The obtained fabric had a cover factor of 2508 and had a low filling degree Z of 7533, and the height difference between recesses and protrusions on the surface was large at 143 μm. When the gas permeability of this fabric was measured, the fabric had a sufficient gas permeability of 0.22 mL/cm$^2$·sec obtained using a Frazier method, but had a slightly large gas permeability of 0.82 L/cm$^2$·min under a differential pressure of 20 kPa, and thus the fabric exhibited concerning gas permeability in terms of the performance of an air bag. Also, an air bag for evaluation was produced using this fabric, and when a deployment test was performed and foldability evaluation was made, the maximum internal pressure at a secondary peak exhibited a sufficient internal pressure of 35 kPa despite being slightly lower than those of Working Examples 1 and 2, but the height after folding was 56.4 mm, and thus the air bag for evaluation had very inferior foldability. It is thought that, with regard to poor foldability, a large height difference between recesses and protrusions on the surface has an influence. Also, it is thought that the maximum internal pressure at a secondary peak is low due to the filling degree Z being low.

TABLE 1

|  |  |  | Work. Ex. 1 | Work. Ex. 2 | Work. Ex. 3 | Work. Ex. 4 | Comp. Ex. 1 | Comp. Ex. 2 |
| --- | --- | --- | --- | --- | --- | --- | --- | --- |
|  | Material |  | PET | PET | PET | PET | PET | PET |
|  | Total fineness | dtex | 470 | 470 | 470 | 470 | 470 | 560 |
|  | Filament number | — | 182 | 144 | 182 | 144 | 120 | 96 |
|  | Single fiber fineness | dtex | 2.58 | 3.26 | 2.58 | 3.26 | 3.92 | 5.83 |
| Weave density | Warp | #/2.54 cm | 62 | 62 | 55 | 55 | 61 | 55 |
|  | Weft | #/2.54 cm | 60 | 59 | 55 | 55 | 54 | 51 |
|  | Cover factor | — | 2645 | 2623 | 2385 | 2385 | 2493 | 2508 |
|  | Thickness | mm | 0.309 | 0.310 | 0.289 | 0.290 | 0.308 | 0.333 |
|  | Z (Filling degree) | — | 8560 | 8462 | 8252 | 8223 | 8095 | 7533 |
|  | Height difference | μm | 121 | 128 | 102 | 108 | 132 | 143 |
|  | Gas permeability/Frazier method | ml/cm$^2$ · sec | 0.10 | 0.12 | 0.39 | 0.49 | 0.36 | 0.22 |
|  | Gas permeability/20 kPa | L/cm$^2$ · min | 0.10 | 0.11 | 0.35 | 0.45 | 1.23 | 0.82 |
| Foldability | Height of folded fabric | mm | 42.9 | 43.8 | 41.3 | 42.0 | 45.5 | 56.4 |
|  | Evaluation | — | A | A | A | A | B | B |
| Deployment test | Max. at secondary peak | kPa | 43 | 41 | 38 | 36 | 32 | 35 |
|  | Evaluation | — | A | A | A | A | B | A |

LIST OF REFERENCE NUMERALS

1 Sample for measuring gas permeability
2 Ring-shaped fastener
3a, 3b Tubular clamp
4 Pressure device
5 Laminar flow tube
6 Flowmeter
7 Pressure adjustment valve
8 Pressure gauge
9 Main body base cloth on mounting port side
10 Main body base cloth on occupant side
11 Inflator mounting port
12 Air hole
13 Bolt fixing hole
14a, 14b Annular cloth
15a, 15b, 15c, 15d Sewing portion
16 Pre-folding form
17 Form in folding intermediate state
18 Form in completely folded state
19 Cross-sectional view of 16 taken along line D-D
20 Cross-sectional view of 17 taken along line E-E
21 Cross-sectional view of 17 taken along line F-F
22 Cross-sectional view of 18 taken along line G-G
23 Air bag
24 Aluminum plate
25 Weight
A Weaving direction of main body base cloth 9
B Weaving direction of annular cloth 14a
C Weaving direction of main body base cloth 10

The invention claimed is:

1. A non-coated air bag fabric,
    wherein the fabric is woven using fibers containing polyethylene terephthalate as a main raw material,
    a thickness of the fabric is 0.28 mm or more,
    the fabric has a cover factor F of 2385 to 2800,
    the thickness D (mm) of the fabric and the cover factor F satisfy F/D≥8200 to 10,000, and
    a height difference between a recess and a protrusion on a surface of the fabric is 102 μm or more and less than 130 μm.

2. The non-coated air bag fabric according to claim 1, wherein a single fiber fineness of threads that constitute the fabric is 1.0 to 3.5 dtex.

3. An air bag formed using at least one main body base cloth formed using the non-coated air bag fabric according to claim 1.

4. An air bag formed using at least one main body base cloth formed using the non-coated air bag fabric according to claim 2.

* * * * *